United States Patent
Stuart

(10) Patent No.: US 9,467,330 B2
(45) Date of Patent: Oct. 11, 2016

(54) DIAGNOSING CONNECTIVITY IN A NETWORK

(71) Applicant: HEWLETT-PACKARD DEVELOPMENT COMPANY, L.P, Houston, TX (US)

(72) Inventor: Leslie R. Stuart, Morgan Hill, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 128 days.

(21) Appl. No.: 14/053,241

(22) Filed: Oct. 14, 2013

(65) Prior Publication Data

US 2015/0103642 A1 Apr. 16, 2015

(51) Int. Cl.
*H04L 12/24* (2006.01)
*H04L 12/26* (2006.01)

(52) U.S. Cl.
CPC ......... *H04L 41/0631* (2013.01); *H04L 41/065* (2013.01); *H04L 43/0811* (2013.01); *H04L 43/08* (2013.01)

(58) Field of Classification Search
None
See application file for complete search history.

(56) References Cited

U.S. PATENT DOCUMENTS

| 7,120,819 | B1* | 10/2006 | Gurer et al. | 714/4.2 |
| 8,982,727 | B2* | 3/2015 | Chou et al. | 370/254 |
| 2002/0143905 | A1* | 10/2002 | Govindarajan et al. | 709/220 |
| 2011/0295942 | A1* | 12/2011 | Raghunath et al. | 709/203 |
| 2013/0329601 | A1* | 12/2013 | Yin et al. | 370/254 |
| 2013/0332399 | A1* | 12/2013 | Reddy et al. | 706/12 |
| 2014/0047274 | A1* | 2/2014 | Lumezanu et al. | 714/37 |
| 2014/0098678 | A1* | 4/2014 | Lumezanu et al. | 370/248 |
| 2014/0337674 | A1* | 11/2014 | Ivancic et al. | 714/43 |

FOREIGN PATENT DOCUMENTS

| CN | 102946325 A | 2/2013 |
| WO | WO-2013112288 A1 | 8/2013 |

OTHER PUBLICATIONS

Arefin, A. et al.; Diagnosing Data Center Behavior Flow by Flow; 2013 IEEE 33rd International Conference on Distributed Computing Systems; pp. 11-20; Jun. 27, 2013.

Heller, B. et al.; Leveraging SDN Layering to Systematically Troubleshoot Networks; Aug. 16, 2013.

* cited by examiner

*Primary Examiner* — Brian Roberts
(74) *Attorney, Agent, or Firm* — Fabian VanCott

(57) ABSTRACT

Diagnosing connectivity in a network includes obtaining information from a network wherein the network is a hybrid network including software-defined networking (SDN) network components and other network components, querying a SDN controller for network metrics of the network, and diagnosing a connectivity issue in the network based on the information from the network and the network metrics.

20 Claims, 7 Drawing Sheets

DIAGNOSING CONNECTIVITY IN A NETWORK

BACKGROUND

A software-defined networking (SDN) controller in a network builds a path through the network to allow a device to connect with other devices within the network. Once the SDN controller builds a path through the network, the SDN controller makes decisions about where network traffic is sent by instructing switches within the network to forward packets of data traveling across the network to and from the device as well as the other devices. As a result, the device is connected to the other devices.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
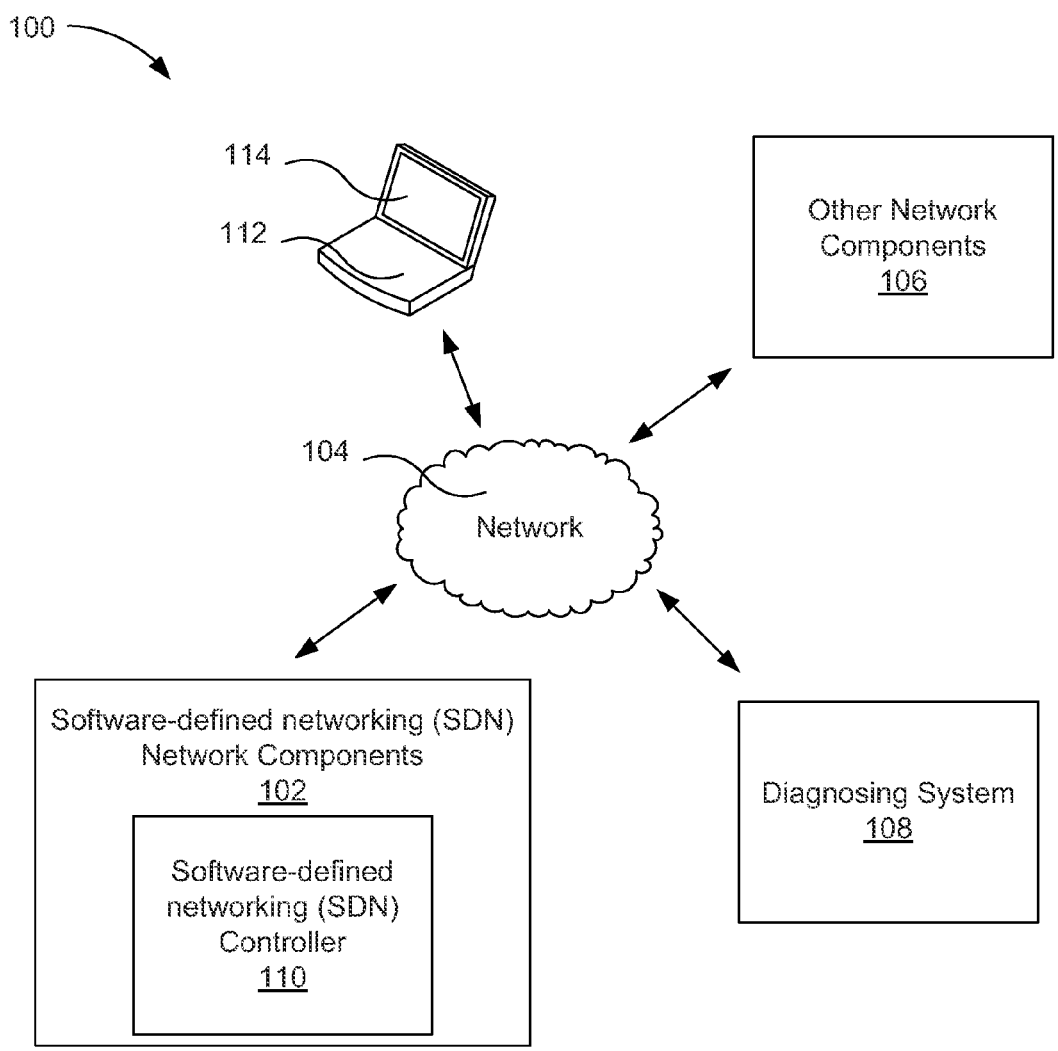
FIG. 1 is a diagram of an example of a system for diagnosing connectivity in a network, according to one example of principles described herein.

To diagnose the connectivity of a device with other devices within a network, traditional network diagnostic tools are built with the assumption that the network is constructed and run by a set of interconnected distributed devices. Further, the traditional network diagnostic tools are built with the assumption that each of the interconnected distributed devices runs a distributed protocol to control the topology of the network and to control the forwarding and filtering functions for packets of data.

Because traditional network diagnostic tools are built with the assumption that a network is constructed and run by a set of interconnected distributed devices, traditional network diagnostic tools are challenging for diagnosing connectivity in a SDN network. Traditional network diagnostic tools are challenging for a SDN network since the SDN network is not under the assumption that the SDN network is constructed and run by a set of interconnected distributed devices. As a result, using traditional network diagnostic tools for diagnosing connectivity in a SDN network can be challenging, error prone, and unreliable.

The principles described herein include a method for diagnosing connectivity in a network. Such a method includes obtaining information from a network wherein the network is a hybrid network comprising SDN network components and other network components, querying a SDN controller for network metrics of the network, and diagnosing a connectivity issue in the network based on the information from the network and the network metrics. Such a method allows a connectivity issue within the network to be resolved by alerting a network administrator to the connectivity issue. As a result, by alerting a network administrator to the connectivity issue, the network administrator may remediate the connectivity issue such that the network's performance and availability is enhanced.

Further, the method can include creating fault report. In one example the fault report includes a path analysis, a node analysis, a match field analysis, a port status analysis, an input and output parameter analysis, an action and group analysis, or combinations thereof of the network. More information about creating the fault report will be described in more detail below.

A network may be the hybrid combination of SDN network components and other network components. In one example, the SDN network components may be a combination of hardware and software that includes a SDN controller, a number of switches, devices, and instructions sent to the switches for forwarding packets of data. In one example, the SDN controller in the SDN network makes decisions about where network traffic is sent by instructing switches within the SDN network to forward packets of data traveling across the SDN network. Other network components may be a combination of hardware and software that includes a number of switches and devices. In one example, the switches include logic that makes decisions about where network traffic is sent within the network to forward packets of data traveling across the network.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for diagnosing connectivity in a network, according to one example of principles described herein. As will be described below, a diagnosing system is in communication with a network to obtain information from the network. In one example, the network may be a hybrid network. For example, the network includes SDN network components and other network components. The diagnosing system queries a SDN controller for network metrics of the network. Further, the diagnosing system diagnoses a connectivity issue in the network based on the information from the network and the network metrics. As will be described below, a graphical user interface (GUI) may be displayed to a network administrator to alert the network administrator to a connectivity issue in the network. As a result, by alerting a network administrator to the connectivity issue, the network administrator may remediate the connectivity issue such that the network's performance and availability is enhanced.

As mentioned above, the system (100) includes a network (104). In one example, the network (104) may be a hybrid network that includes SDN network components (102) and other network components (106).

In one example, the SDN network components (102) may be a combination of hardware and software that includes a SDN controller (110), a number of switches, devices, and instructions sent to the switches for forwarding packets of data. In one example, the SDN controller (110) makes decisions about where network traffic is sent by instructing switches within the SDN network components (102) to forward packets of data traveling across the SDN network components (102) in the network (104).

As mentioned above, the network (104) includes other network components (106). In one example, the other network components (106) may be a combination of hardware and software that includes a number of switches and devices. In one example, the switches include logic that makes decisions about where network traffic is sent within the other network components (106) to forward packets of data traveling across the other network components (106) in the network (104).

The system (100) further includes a diagnosing system (108). In keeping with the given example, the diagnosing system (108) obtains information from the network (104). In this example, the network (104) includes SDN network components (102) and other network components (106). In one example, to obtain information about the SDN network components (102), the diagnosing system (108) uses the SDN controller (110) to create an SDN topology of the SDN network components (102). Additionally, to obtain information about the other network components (106), the diagnosing system (108) issues a ping, a traceroute, or combinations thereof to create a component topology of the other network components (106). More information about obtaining information from the network (104) will be described in other parts of this specification.

The diagnosing system (106) further queries the SDN controller (110) for network metrics of the network (104). In one example, the metrics of the network includes an OpenFlow metric, a matching field metric, a port status metric, an input and output parameter metric, an action and group metric, other metrics, or combinations thereof. More information about querying the SDN controller (110) for network metrics of the network (104) will be described in other parts of this specification.

The diagnosing system (106) further diagnoses a connectivity issue in the network (104) based on the information from the network (104) and the network metrics. In one example, diagnosing a connectivity issue in the network (104) based on the information from the network (104) and the network metrics, includes creating a fault report. In one example, the fault report is made available to a network administrator as a GUI on a display (114) using a user device (112) connected to the network (104). As mentioned above, the GUI alerts the network administrator to a connectivity issue in the network (104). As a result, by alerting a network administrator to the connectivity issue, the network administrator may remediate the connectivity issue such that the network's performance and availability is enhanced. More information about the GUI will be described in later parts of this specification.

While this example has been described with reference to the diagnosing system being located over the network, the diagnosing system may be located in any appropriate location according to the principles described herein. For example, the diagnosing system may be located in a user device, a server, or combinations thereof.

Figure 2:
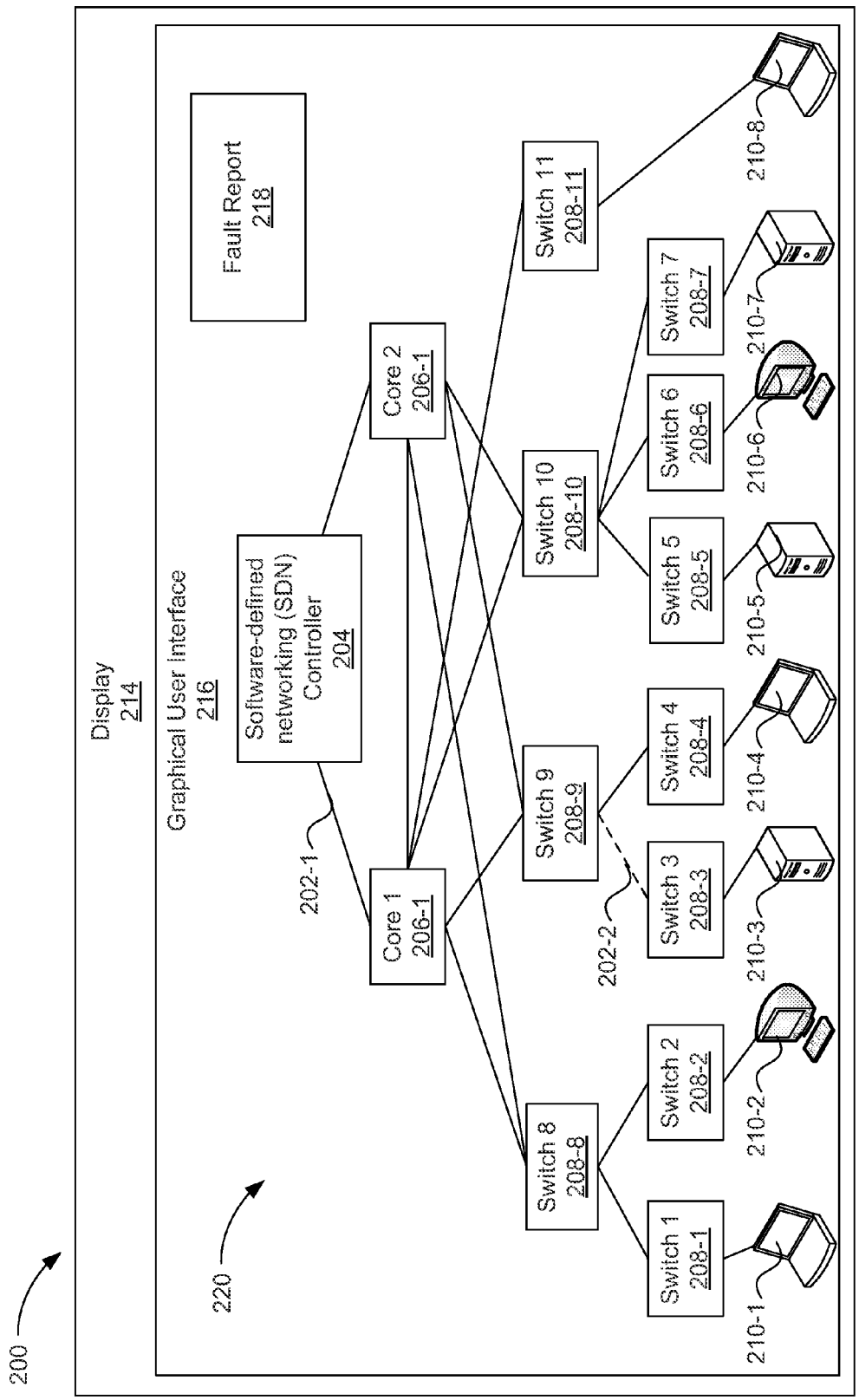
FIG. 2 is a diagram of an example of a fault topology for diagnosing connectivity in a network, according to one example of principles described herein.

FIG. 2 is a diagram of an example of a fault topology for diagnosing connectivity in a network, according to one example of principles described herein. As mentioned above, the diagnosing system diagnoses a connectivity issue in the network based on the information from the network and the network metrics. In one example, diagnosing a connectivity issue in the network based on the information from the network and the network metrics includes creating a fault report. In this example, the fault report is made available to a network administrator as a GUI (216) via a display (214). As mentioned above, the GUI (216) alerts the network administrator to a connectivity issue in the network. As a result, by alerting a network administrator to the connectivity issue, the network administrator may remediate the connectivity issue such that the network's performance and availability is enhanced.

In the example of FIG. 2, the display (214) displays a fault topology (200) via a GUI (216). In this example, the fault topology (220) includes a SDN controller (204), cores (206), switches (208), and a number of devices (210). The creation of the fault topology (220) will be now described.

As mentioned above, the diagnosing system obtains information from the network. In this example, the network is a hybrid network that includes SDN network components and other network components. In one example, to obtain information about the SDN network components, the diagnosing system uses the SDN controller to create an SDN topology of the SDN network components. In this example, the SDN topology may include a SDN controller (204), switch 8 (208-8), switch 9 (208-9), and switch 5 (208-5).

Additionally, to obtain information about the other network components, the diagnosing system issues a ping, a traceroute, or combinations thereof to create a component topology of the other network components. In this example, the component topology may include the core 1 (206-1), core 2 (206-2), switch 1 (208-1), switch 2 (208-2), switch 3 (208-3), switch 4 (208-4), switch 6 (208-6), switch 7 (208-7), switch 10 (208-10), switch 11 (208-11), and devices (210). As a result, both the SDN topology and the component topology may be displayed as a fault topology (220) via the GUI (216).

As mentioned above, the diagnosing system further diagnoses a connectivity issue in the network based on the information from the network and the network metrics. In one example, diagnosing a connectivity issue in the network based on the information from the network and the network metric includes creating a fault report (218). In this example, the fault report (218) may be displayed via the GUI (216). More information about the fault report (218) will be described in later parts of this specification.

Further, the GUI (216) displays the connectivity statuses (202) of the fault topology (220). In one example, the connectivity statuses (202) in the fault topology (220) are depicted as lines connecting the SDN controller (204), the cores (206), the switches (208), and the device (210). In this example, the solid lines indicate that one component is connected to another component. For example, a solid line depicted as a connectivity status (202-1) indicates that the SDN controller (204) is connected to core 1 (206-1). As a result, there is not a connectivity issue between the SDN controller (204) and core 1 (206-1). Further, the dashed line depicted as a connectivity status (202-2) indicates that there is a connection issue between switch 9 (208-9) and switch 3 (208-3). As a result, the dashed line alerts the network administrator to a connectivity issue in the network. By alerting a network administrator to the connectivity issue, the network administrator may remediate the connectivity issue such that the network's performance and availability is enhanced. Further, a fault report (218) is created that includes details of the connection issue between switch 9 (208-9) and switch 3 (208-3).

Figure 3A:
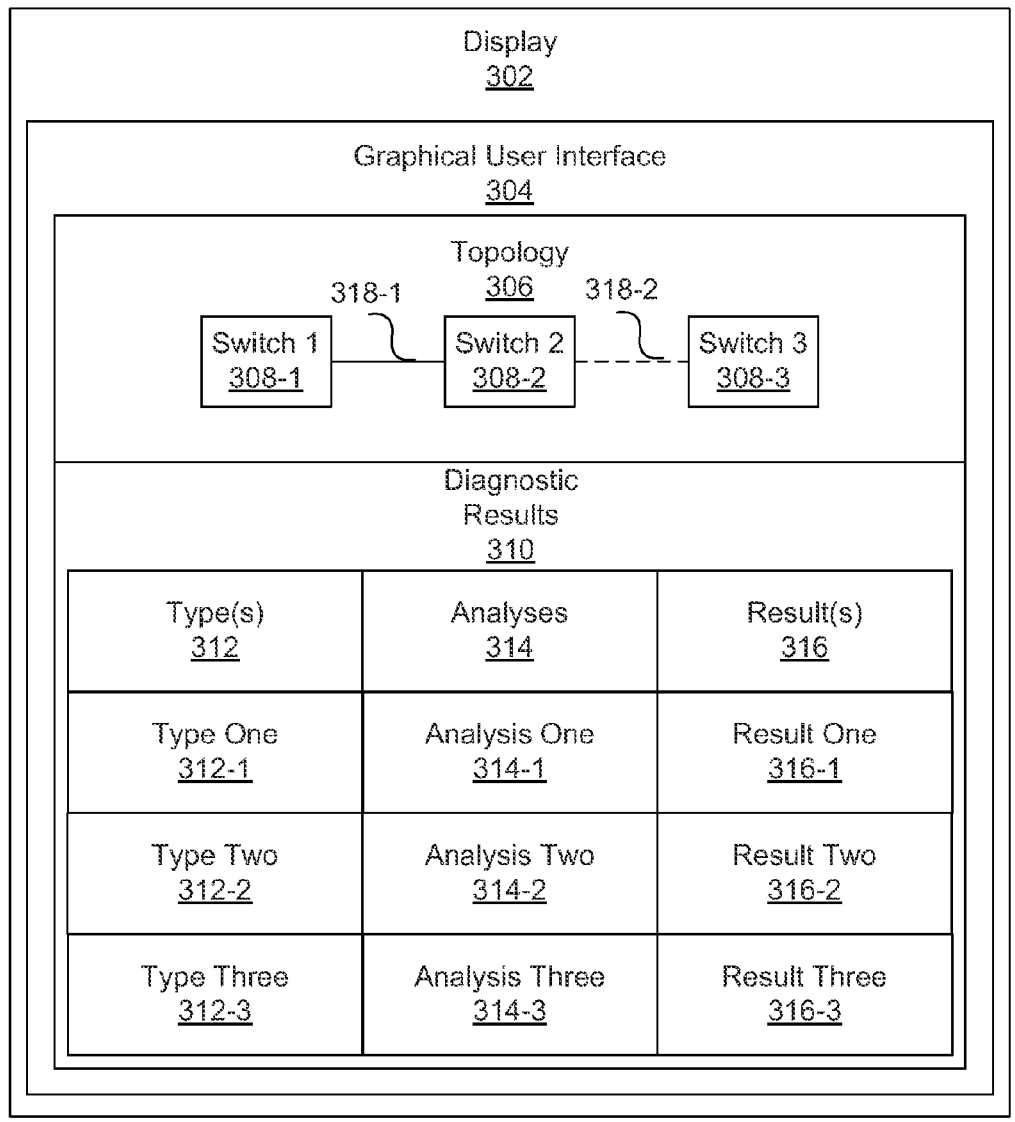
FIG. 3A is a diagram of an example of diagnostic results for diagnosing connectivity in a network, according to one example of principles described herein.

FIG. 3A is a diagram of an example of diagnostic results for diagnosing connectivity in a network, according to one example of principles described herein. As mentioned above, a GUI (304) is used to alert the network administrator to a connectivity issue in the network. As a result, by alerting a network administrator to the connectivity issue, the network administrator may remediate the connectivity issue such that the network's performance and availability is enhanced.

In the example of FIG. 3A, the GUI (304) may include a topology (306) of the network and diagnostic results (310). In this example, the topology (306) includes three switches (308). Switch 1 (308-1) is connected to switch 2 (308-2) as indicated by a solid line (318-1). Further, switch 2 (308-2) is connected to switch 3 (308-3). However, as indicated by a dashed line (318-2), there are connectivity issues between switch 2 (308-2) and switch 3 (308-3).

In this example, the diagnostic results (310) for the connectivity issues between switch 2 (308-2) and switch 3 (308-3) are displayed in the GUI (304). In one example, the diagnostic results (310) for switch 2 (308-2) and switch 3 (308-3) may include types (312), analyses (314), and results (316).

In one example, the types (312) may include the type of connectivity issue between switch 2 (308-2) and switch 3 (308-3). For example, the type of connectivity issues between switch 2 (308-2) and switch 3 (308-3) may involve link jitter, packet loss, delay time, device reachable, memory availability, central processing unit (CPU) availability, other connectivity issues or combinations thereof. In one example, the connectivity issues between switch 2 (308-2) and switch 3 (308-3) includes three types (312) of connectivity issues. For example, type one (312-1) may be link jitter, type two (312-2) may be delay time, and type three (312-3) may be memory availability. In this example, each of the three types (312) contribute to connectivity issues between switch 2 (308-2) and switch 3 (308-3).

Further, the diagnostic results (310) may include analyses (314). In this example, the analyses (314) may include an analysis for each type (312). For example, analysis one (314-1) may be made for type one (312-1). In this example, analysis one (314-1) may include indicating jitter is the cause of connectivity issues between switch 2 (308-2) and switch 3 (308-3). However, result one (316-1) may indicate that even though jitter is a cause of connectivity issues between switch 2 (308-2) and switch 3 (308-3), the jitter between switch 2 (308-2) and switch 3 (308-3) is not a significant connectivity issue.

In another example, analysis two (314-2) may be made for type two (312-2). In this example, analysis two (314-2) may include indicating delay time is also a cause of connectivity issues between switch 2 (308-2) and switch 3 (308-3). In this example, result two (316-2), may indicate that the delay time between switch 2 (308-2) and switch 3 (308-3) is a significant connectivity issue.

In yet another example, analysis three (314-3) may be made for type three (312-3). In this example, analysis three (314-3) may include indicating memory availability is a cause of connectivity issues between switch 2 (308-2) and switch 3 (308-3). However, result three (316-3) may indicate that even though memory availability is the cause of connectivity issues between switch 2 (308-2) and switch 3 (308-3), the memory availability for switch 2 (308-2) and switch 3 (308-3) is not a significant connectivity issue.

While this example has been described with reference to the diagnostic results having three types, three analyses, and three results, the diagnostic results may have any appropriate number of types, analyses, and results. For example, the diagnostic results may have seven types, ten analyses, and seven results.

Figure 3B:
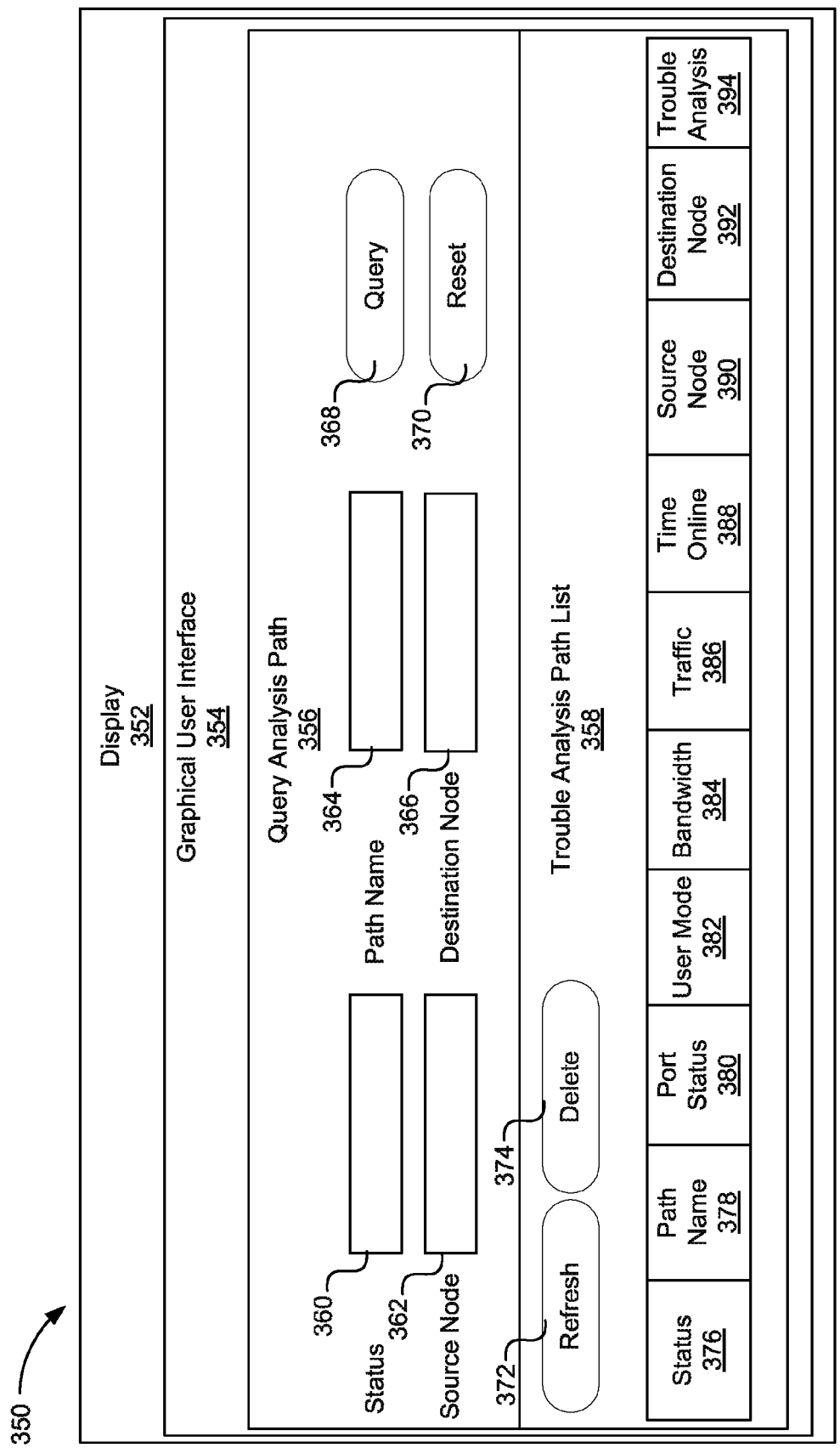
FIG. 3B is a diagram of an example of an analysis path for diagnosing connectivity in a network, according to one example of principles described herein.

FIG. 3B is a diagram of an example of an analysis path for diagnosing connectivity in a network, according to one example of principles described herein. As mentioned above, a graphical user interface (GUI) may be displayed to a network administrator to alert the network administrator to a connectivity issue in the network. As a result, by alerting a network administrator to the connectivity issue, the network administrator may remediate the connectivity issue such that the network's performance and availability is enhanced.

In the example of FIG. 3B, a GUI (354) may include a query analysis path (356) and a trouble analysis path list (358). In this example, the network administrator may input information into the query analysis path (356). For example, the network administrator may input information such as a status in the status text box (360) to specify the status of the path. Further, the network administrator may input information such as a source node in the source node text box (362) to specify the name of a source node in the path. Still further, the network administrator may input information such as a path name in the path name text box (364) to specify the name of the path. Even still further, the network administrator may input information such as a destination node into a destination node text box (366) to specify a destination node in the path. In keeping with the given example, the network administrator may select a query button (368). By selecting the query button (368), information about a path, as specified by the network administrator, is displayed in the trouble analysis path list (358). Additionally, if the network administrator desires to reset the information in the status text box (360), the source node text box (362), the path name text box (364), and the destination node text box (366), the network administrator may select a reset button (370).

As mentioned above, by selecting the query button (368), information about a path, as specified by the network administrator, is displayed in the trouble analysis path list (358). In this example, the trouble analysis path list (358) may include a status (376), a path name (378), a port status (380), a user mode (382), a bandwidth (384), traffic (386), a time online (388), a source node (390), a destination node (392), a trouble analysis (394), or combinations thereof.

In one example, the status (376) indicates if the status of a path is up or down. If a status is up there are no connectivity issues within the path. If the status is down there are connectivity issues within the path. The path name (378) may include the name of the path. For example, Test center. The port status (380) may include the status of the port. For example, if the port is used, the port status (380) may be normal. However, if the port is not used, the port status (380) may be undeployed. The user mode (382) may indicate if the user mode (382) is in use or not on the path. The bandwidth (384) may include how much bandwidth the path is using. For example, the bandwidth (384) may be 20 Mega bits per second. The traffic (386) may include how much traffic is on the path.

The time online (388) may indicate how much time a path has been online. For example, the time online (388) may indicate the path has been online for two hours. The source node (390) displays the name of the source node. For example, the name of the source node may be DC. The destination node (392) displays the name of the destination node. For example, the name of the destination node may be Boston. The trouble analysis (394) indicates if there are connectivity issues on the path. In one example, the trouble analysis (394) indicates if there are connectivity issues on the path by using an icon. In this example, if the icon is displayed, there are connectivity issues on the path. Alternatively, if the icon is not displayed, there are no connectivity issues on the path.

Further, if a network administrator desires to delete a path from the trouble analysis path list (354), the network administrator may select a delete button (374). In this example, the delete button (374) deletes the most recent trouble analysis path list (358).

Still further, if a network administrator desires to refresh the path in the trouble analysis path list (354), the network administrator may select a refresh button (372). In this example, the refresh button (372) refreshes the trouble analysis path list (358).

While this example has been described with reference to the trouble analysis path list displaying one path, the trouble analysis path list may display several paths. For example, the trouble analysis path list may display ten paths.

Figure 4:
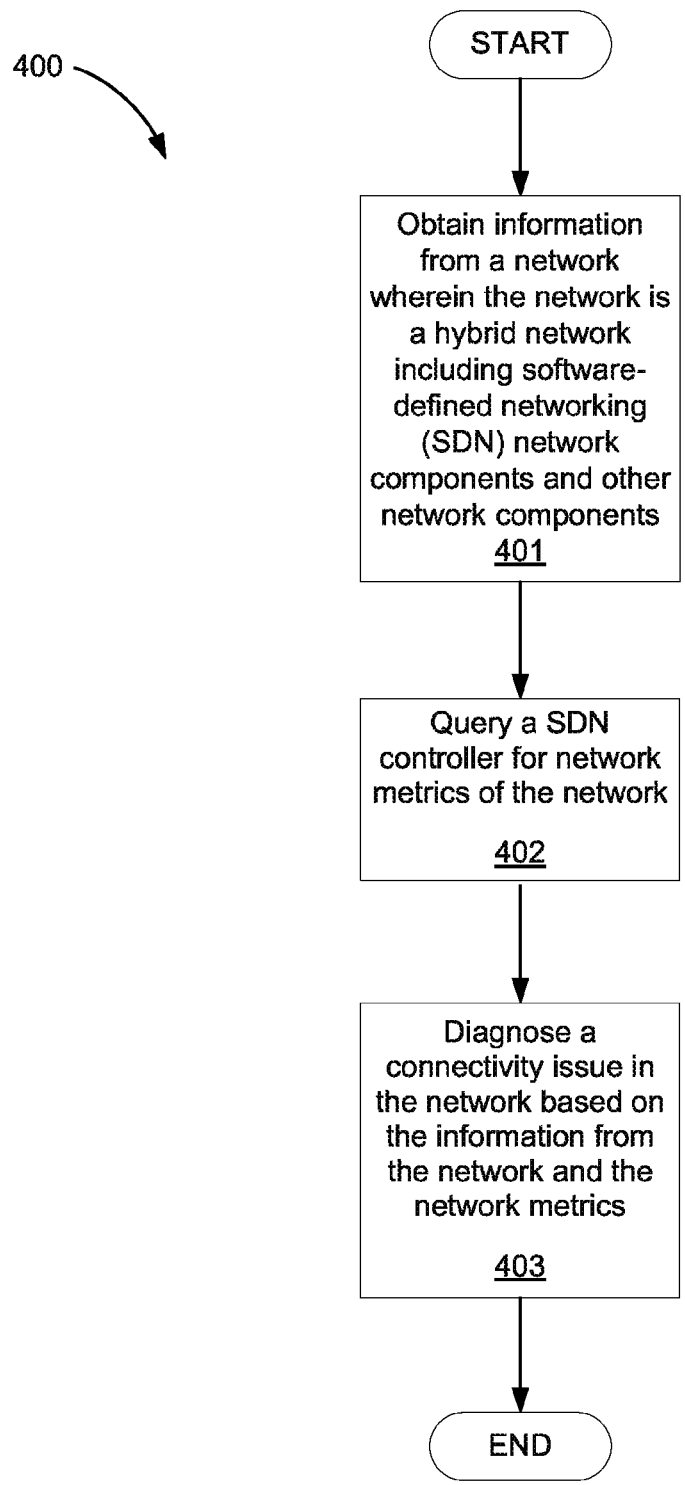
FIG. 4 is a flowchart of an example of a method for diagnosing connectivity in a network, according to one example of principles described herein.

FIG. 4 is a flowchart of an example for a method for diagnosing connectivity in a network, according to one example of principles described herein. In this example, the method (400) includes obtaining (401) information from a network wherein the network is a hybrid network including SDN network components and other network components, querying (402) a SDN controller for network metrics of the network, and diagnosing (403) a connectivity issue in the network based on the information from the network and the network metrics.

As mentioned above, the method includes obtaining (401) information from a network wherein the network is a hybrid network including SDN network components and other network components. As mentioned above, to obtain information about the SDN network components in the network, the diagnosing system uses the SDN controller to create a SDN topology of the SDN network components. In one example, the SDN topology may includes SDN controllers, cores, switches, and a number of devices.

Additionally, to obtain information about the other network components, the diagnosing system issues a ping to create a component topology of the other network components. In one example, a ping is used to test the reach ability of a host on an internet protocol network to measure the round-trip time for a packet of data sent form the originating host to a destination, such as a user device. In one example, the ping can be used to determine if there is any packet loss on the network. Further, the results of the test may be in the form of a statistical summary of the response packets received. In one example, the statistical summary includes the minimum, maximum, and the mean round-trip times, and sometimes the standard deviation of the mean. In one example, the ping does not evaluate or compute the time to establish the connection; rather the ping gives the mean round-trip times of an established connection with an open session. As a result, a ping computes the final round-trip times from the destination point.

In another example, to obtain information about the other network components, the diagnosing system issues a traceroute to create a component topology of the other network components. In one example, a traceroute is a diagnostic tool for displaying a path and measuring transit delays of packets of data across a network. In one example, the path is recorded as the round-trip times of the packets received from each successive host in the path.

The method further includes querying (402) a SDN controller for network metrics of the network. In one example, the SDN controller can be queried for network metrics such as OpenFlow, matching field, port status, action and group, input and output parameters, other network metrics, or combinations thereof.

In one example, OpenFlow is a communications protocol that gives access to the forwarding plane of a network, switches, and routers over the network. In this example the OpenFlow includes metrics about the communications protocol for each node in the network. For example, OpenFlow processed packets of data, packet processing speed, OpenFlow resource consumption, or combinations thereof.

As mentioned above, the SDN controller may be queried for matching fields. In this example, a node may include at least one field that is a link to another node and a data field. In one example, the link and data fields may be implemented by pointers and references. In keeping with the given example, matching field may include determining if a specific field for a node in the network matches. In another example, a matching filed may include determining if a header field in packets of data matches an entry in a lookup table. In one example, the lookup table specifies where to forward the packets of data.

The SDN controller may be further queried for a port status. In one example, the port status may indicate the status of a port. For example, if a port is does not exhibit connectivity issues, the port status may be normal. Alternatively, if the port is experiencing connectivity issues, the port status may indicate the port is having connectivity issues.

As mentioned above, the SDN controller may be queried for action and group. In one example, the action and group may include actions to be taken by the SDN network components as well as the group that is to implement the action. Further, the action may indicate how the SDN network components, such as a switch, handles matching packets of data. In one example, an action may be to forward a packet of data out of a specified port. In this example, the specified port is the group implementing the action.

Further, the SDN controller is queried for the input and output parameters of the SDN network components. In one example, an SDN network component may be a switch. In this example, the input and output parameters specify the information the switch can receive and the information the switch can send.

As mentioned above, the method includes diagnosing (403) a connectivity issue in the network based on the information from the network and the network metrics. In one example, based on the information from the network and the network metrics, a connectivity issue may be diagnosed as link jitter, packet loss, delay time, device reachable, memory availability, CPU availability, other types or combinations thereof. Further, diagnosing a connectivity issue in the network based on the information from the network and the network metrics includes creating a fault report. More information about creating a fault report will be described in later parts of this specification.

Figure 5:
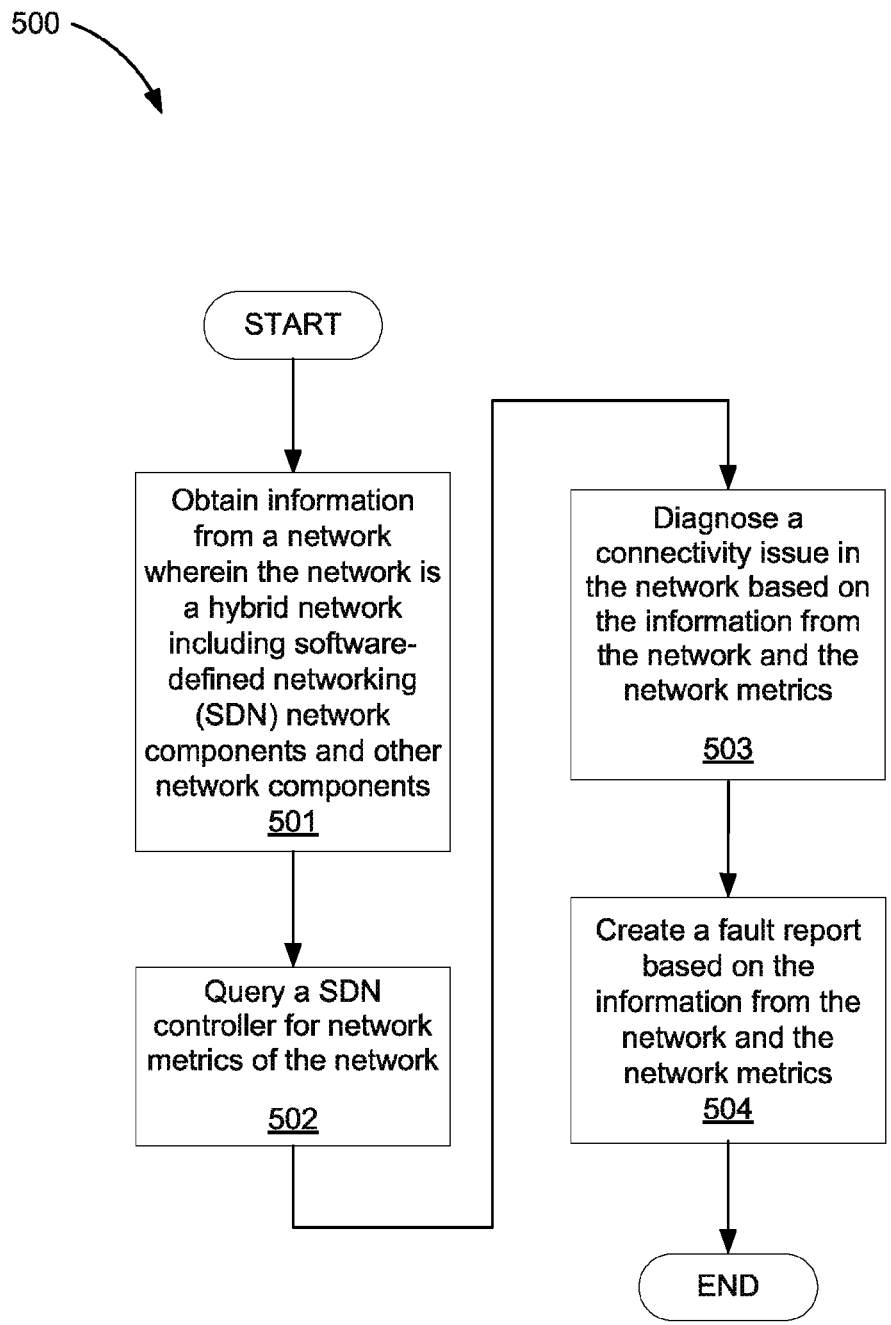
FIG. 5 is a flowchart of an example of a method for diagnosing connectivity in a network, according to one example of principles described herein.

FIG. 5 is a flowchart of an example for a method for diagnosing connectivity in a network, according to one example of principles described herein. In this example, the method (500) includes obtaining (501) information from a network wherein the network is a hybrid network including SDN network components and other network components, querying (502) a SDN controller for network metrics of the network, diagnosing (503) a connectivity issue in the network based on the information from the network and the network metrics, and creating (504) a fault report based on the information from the network and the network metrics.

As mentioned above, the method includes creating (504) a fault report based on the information from the network and the network metrics. In this example, the fault report is made available to a network administrator as a GUI via a display. In one example, the fault report includes a path analysis, a node analysis, a match field analysis, a port status analysis, an input and output parameter analysis, an action and group analysis, or combinations thereof of the network.

In one example, if the path analysis indicates a path is inaccurate, the GUI alerts the network administrator to a path connectivity issue. As a result, by alerting a network administrator to the connectivity issue, the network administrator may remediate the connectivity issue such that the network's performance and availability is enhanced.

In keeping with the given example, if the node analysis indicates a node is not functioning properly, the GUI alerts the network administrator to the node connectivity issue. As a result, by alerting a network administrator to the connectivity issue, the network administrator may remediate the connectivity issue such that the network's performance and availability is enhanced.

Further, if the matching field analysis indicates a matching field is mismatched, the GUI alerts the network administrator to a matching filed connectivity issue. As a result, by alerting a network administrator to the connectivity issue, the network administrator may remediate the connectivity issue such that the network's performance and availability is enhanced.

In still keeping with the given example, if the port status analysis indicates a port is not functioning properly, the GUI alerts the network administrator to a port status connectivity issue. As a result, by alerting a network administrator to the connectivity issue, the network administrator may remediate the connectivity issue such that the network's performance and availability is enhanced.

Further, if the input and output analysis indicates a switch is not functioning properly, the GUI alerts the network administrator to an input and output connectivity issue. As a result, by alerting a network administrator to the connectivity issue, the network administrator may remediate the connectivity issue such that the network's performance and availability is enhanced.

In keeping with the given example, if the action and group analysis indicates an action and/or a group is not functioning properly, the GUI alerts the network administrator to an action and group connectivity issue. As a result, by alerting a network administrator to the connectivity issue, the network administrator may remediate the connectivity issue such that the network's performance and availability is enhanced.

Further, the fault report may indicate other connectivity issues in the network. As mentioned above, the connectivity issues may be diagnosed as link jitter, packet loss, delay time, device reachable, memory availability, CPU availability, other types or combinations thereof.

Figure 6:
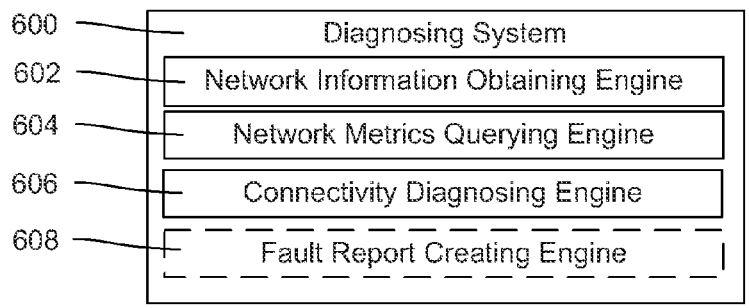
FIG. 6 is a diagram of an example of a diagnosing system, according to one example of principles described herein.

FIG. 6 is a diagram of an example of a diagnosing system, according to one example of principles described herein. The diagnosing system (600) includes a network information obtaining engine (602), a network metrics querying engine (604), and a connectivity diagnosing engine (606). The system (600) also includes a fault report creating engine (608). The engines (602, 604, 606, 608) refer to a combination of hardware and program instructions to perform a designated function. Each of the engines (602, 604, 606, 608) may include a processor and memory. The program instructions are stored in the memory and cause the processor to execute the designated function of the engine.

The network information obtaining engine (602) obtains information from a network wherein the network. In one example, the network information obtaining engine (602) obtains information from SDN network components. In another example, the network information obtaining engine (602) obtains information from other network components.

The network metrics querying engine (604) queries a SDN controller for network metrics of the network. In one example the network metrics include OpenFlow, matching field, port status, action and group, input and output parameters, other network metrics, or combinations thereof.

The connectivity diagnosing engine (606) diagnoses a connectivity issue in the network based on the information from the network and the network metrics. In one example, the connectivity diagnosing engine (606) diagnoses a connectivity issue on a network due to link jitter, packet loss, delay time, device reachable, memory availability, CPU availability, other connectivity issues or combinations thereof.

The fault report creating engine (608) creates a fault report. In one example, a fault report includes a path analysis, a node analysis, a match field analysis, a port status analysis, an input and output parameter analysis, an action and group analysis, or combinations thereof of the SDN network.

Figure 7:
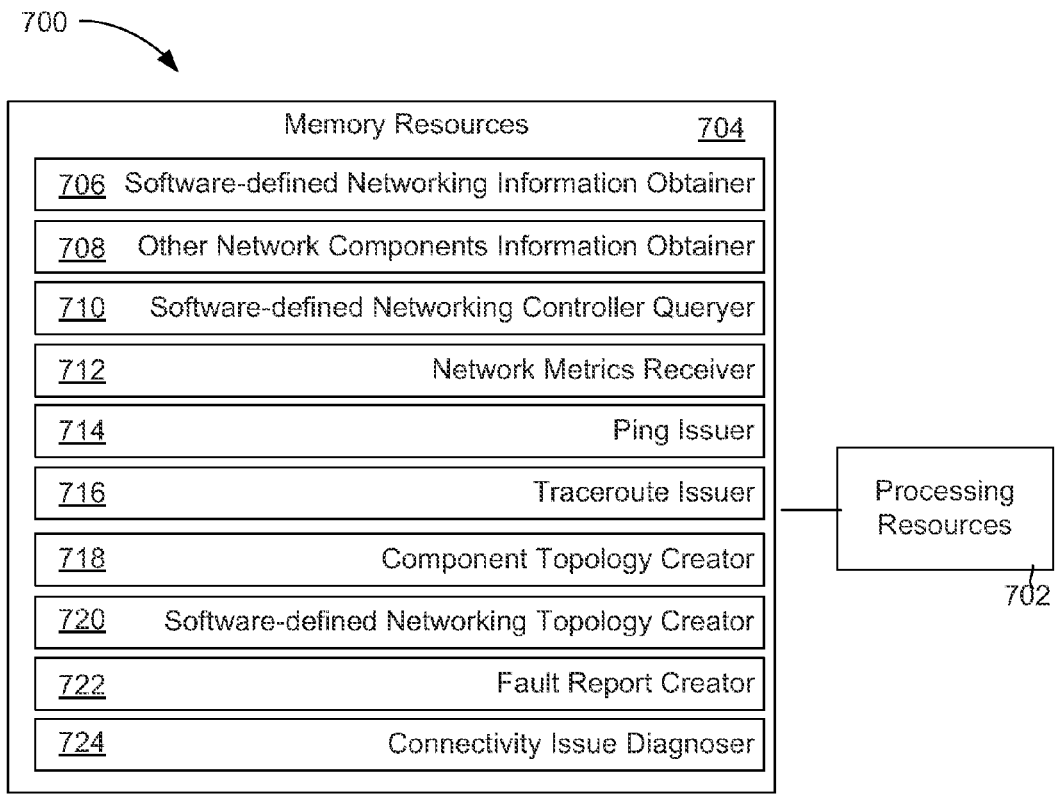
FIG. 7 is a diagram of an example of a diagnosing system, according to one example of principles described herein.

FIG. 7 is a diagram of an example of a diagnosing system, according to one example of principles described herein. In this example, the diagnosing system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the diagnosing system (700). The programmed instructions shown stored in the memory resources (704) include a software-defined networking information obtainer (706), an other network component information obtainer (708), a software-defined networking controller queryer (710), a network metrics receiver (712), a ping issuer (714), a traceroute issuer (716), a component topology creator (718), a software-defined networking topology creator (720), a fault report creator (722), and a connectivity issue diagnoser (724).

The memory resources (704) include a computer readable storage medium that contains computer readable program code to cause tasks to be executed by the processing resources (702). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The software-defined networking information obtainer (706) represents programmed instructions that, when executed, cause the processing resources (702) to obtain information about SDN network components. The other network component information obtainer (708) represents programmed instructions that, when executed, cause the processing resources (702) to obtain information about other network component. The software-defined networking controller queryer (710) represents programmed instructions that, when executed, cause the processing resources (702) to query a SDN controller for network metrics. The network metrics receiver (712) represents programmed instructions that, when executed, cause the processing resources (702) to receive network metrics. The ping issuer (714) represents programmed instructions that, when executed, cause the processing resources (702) to issue a ping. The traceroute issuer (716) represents programmed instructions that, when executed, cause the processing resources (702) to issue a traceroute.

The component topology creator (718) represents programmed instructions that, when executed, cause the processing resources (702) to create a component topology. The software-defined networking topology creator (720) represents programmed instructions that, when executed, cause the processing resources (702) to create a SDN topology. The fault report creator (722) represents programmed instructions that, when executed, cause the processing resources (702) to create a fault report. The connectivity issue diagnoser (724) represents programmed instructions that, when executed, cause the processing resources (702) to diagnose a connectivity issue in the network.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the diagnosing system (700) may be implemented on a user device, on a server, on a collection of servers, or combinations thereof.

The diagnosing system (700) of FIG. 7 may be part of a general purpose computer. However, in alternative examples, the diagnosing system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for diagnosing connectivity in a network, said method comprising:
   obtaining information from a network wherein said network is a hybrid network comprising software-defined networking (SDN) network components and other network components;
   querying a SDN controller for network metrics of said network; and
   diagnosing a connectivity issue in said network based on said information from said network and said network metrics.

2. The method of claim 1, wherein obtaining said information from said network includes using said SDN controller to create a SDN topology of said SDN network components.

3. The method of claim 1, wherein obtaining said information from said network includes issuing a ping, a traceroute, or combinations thereof to create a component topology of said other network components.

4. The method of claim 1, further comprising creating a fault report based on said information from said network and said network metrics.

5. The method of claim 4, wherein said fault report includes a path analysis, a node analysis, a match field analysis, a port status analysis, an input and output parameter analysis, an action and group analysis, or combinations thereof of said network.

6. The method of claim 5, wherein said fault report indicates said connectivity issue in said network.

7. The method of claim 6, wherein said connectivity issue involves link jitter, packet loss, delay time, device reachable, memory availability, central processing unit (CPU) availability, or combinations thereof.

8. The method of claim 1, further comprising:
   combining information from said SDN controller with information from said other network components that are outside a domain of the SDN controller to produce a fault topology for the network based on both an SDN topology of SDN network components and a component topology of said other network components outside a domain of the SDN controller;
   wherein said diagnosing the connectivity issue comprises using said fault topology.

9. A system for diagnosing connectivity in a network, said system comprising:
   a diagnosing system;
   a network interface connecting the diagnosing system to a network wherein said network is a hybrid network comprising a Software-Defined Networking (SDN) controller, SDN network components and other components of the network outside a domain of the SDN controller;
   the diagnosing system to:
   query the SDN controller for network metrics of said network;
   communicate with the other components of the network to obtain other network information;
   combine the network metrics from the SDN controller with the other network information to produce combined information;
   diagnose a lack of connectivity issue in said network based on said combined information; and
   create a fault report based on a result of the diagnosis.

10. The system of claim 9, the diagnosing system further to:
  use data from said SDN controller to create a SDN topology of said SDN network components; and
  use a ping, a traceroute, or combinations thereof to create a component topology of said other network components.

11. The system of claim 10, further comprising a graphical user interface for displaying a network topology combining said SDN topology and said component topology, said displayed network topology illustrating a location between components of the lack of connectivity issue.

12. The system of claim 9, wherein said fault report includes a path analysis, a node analysis, a match field analysis, a port status analysis, an input and output parameter analysis, an action and group analysis, or combinations thereof of said network.

13. The system of claim 9, wherein said fault report indicates said connectivity issue in said network and wherein said connectivity issue involves link jitter, packet loss, delay time, device reachable, memory availability, central processing unit (CPU) availability, or combinations thereof.

14. The system of claim 9, further comprising a graphical user interface for displaying the result of the diagnosis, the result comprising a listing of different types of connectivity issue diagnosis; a listing of an analysis made for each type of connectivity issue and a result for each analysis made.

15. The system of claim 9, further comprising a graphical user interface for accepting user input specifying a source node and a destination node and then initiating an analysis of a path between said source and destination nodes.

16. The system of claim 15, wherein the analysis of the path between said source and destination nodes comprises a bandwidth metric, traffic metric and time online metric.

17. A computer program product for diagnosing connectivity in a network, comprising:
  a non-transitory computer readable storage medium, said computer readable storage medium comprising computer readable program code embodied therewith, said computer readable program code comprising program instructions that, when executed, causes a processor to:
  obtain information from a network wherein said network is a hybrid network comprising software-defined networking (SDN) network components and other network components, said information comprising two sets of data including a first data set of network metrics obtained by querying an SDN controller in control of said SDN network components and a second set of data obtained by pinging or tracerouting the other network component which are not under control of the SDN controller; and
  diagnose a lack of connectivity issue in said network based on a combination of said first and second data sets.

18. The computer program product of claim 17, further comprising computer readable program code comprising program instructions that, when executed, cause said processor to generate a network topology using both said first and second data sets.

19. The computer program product of claim 17, further comprising computer readable program code comprising program instructions that, when executed, cause said processor to create a fault report based on said combination of said first and second data sets.

20. The computer program product of claim 19, wherein said fault report includes a path analysis, a node analysis, a match field analysis, a port status analysis, an input and output parameter analysis, an action and group analysis, or combinations thereof of said network.

* * * * *